(12) United States Patent
de Roest

(10) Patent No.: US 7,160,085 B2
(45) Date of Patent: Jan. 9, 2007

(54) WIND TURBINE

(75) Inventor: Anton Herrius de Roest, Enschede (NL)

(73) Assignee: Mecal Applied Mechanics B.V., Enschede (NL)

( * ) Notice: Subject to any disclaimer, the term of this patent is extended or adjusted under 35 U.S.C. 154(b) by 143 days.

(21) Appl. No.: 10/504,186

(22) PCT Filed: Feb. 12, 2003

(86) PCT No.: PCT/NL03/00103

§ 371 (c)(1),
(2), (4) Date: Mar. 4, 2005

(87) PCT Pub. No.: WO03/069099

PCT Pub. Date: Aug. 21, 2003

(65) Prior Publication Data

US 2005/0129504 A1   Jun. 16, 2005

(30) Foreign Application Priority Data

Feb. 12, 2002  (NL) .................................. 1019953

(51) Int. Cl.
*F03D 11/04* (2006.01)
(52) U.S. Cl. ...................... 416/244 R; 52/40; 52/726.3
(58) Field of Classification Search ............ 416/244 R; 52/40, 223.4, 726.3, 726.4
See application file for complete search history.

(56) References Cited

U.S. PATENT DOCUMENTS

| 3,099,220 | A | * | 7/1963 | Butman | 417/336 |
|---|---|---|---|---|---|
| 3,196,990 | A | | 7/1965 | Handley | |
| 3,217,459 | A | * | 11/1965 | Meyer | 52/28 |
| 3,276,182 | A | | 10/1966 | Handley | |
| 3,561,890 | A | * | 2/1971 | Peterson | 417/336 |
| 3,728,837 | A | | 4/1973 | Kiefer, Jr. | |
| 4,187,660 | A | | 2/1980 | Lin et al. | |
| 4,248,025 | A | | 2/1981 | Kleine et al. | |
| 4,340,882 | A | * | 7/1982 | Maio et al. | 341/118 |
| 5,117,607 | A | | 6/1992 | Bourdon | |
| 6,408,575 | B1 | * | 6/2002 | Yoshida et al. | 52/40 |

FOREIGN PATENT DOCUMENTS

| DE | 198 32 921 | | 2/2000 |
|---|---|---|---|
| EP | 1262614 A2 | * | 12/2002 |
| FR | 1 145 789 | | 10/1957 |

OTHER PUBLICATIONS

International Search Report, Form PCT/ISA/210, as issued by European Patent Office in Connection with PCT Application No. PCT/NL03/00103.
International Preliminary Examination Report, Form PCT/IPEA/409, as issued by the European Patent Office in Connection with PCT Application No. PCT/NL03/00103.
"Danske Vindmøller (1): Portreet At Micron's 250 KW Mølle", Naturlig Energi Manedsmagasin (Jan. 1992).

* cited by examiner

*Primary Examiner*—Ninh H. Nguyen
(74) *Attorney, Agent, or Firm*—Quarles & Brady LLP

(57) ABSTRACT

A wind turbine, comprising a stationary vertical mast (or tower) on which a moving part of the wind turbine is arranged, which mast is at least partly composed from prefabricated wall parts, with several adjacent wall parts forming a substantially annular mast section. The invention also relates to a mast for a wind turbine, to a prefabricated wall part and to a method for building a wind turbine.

23 Claims, 17 Drawing Sheets

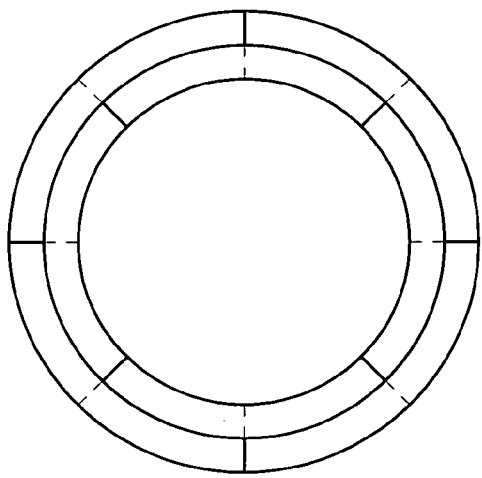
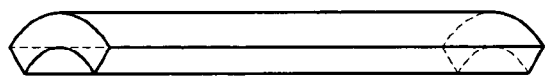
(H)
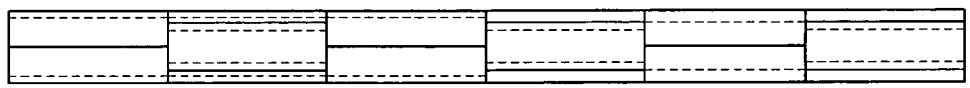
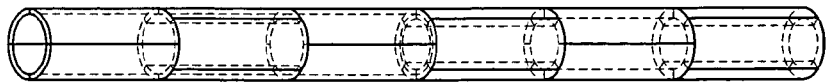
Fig. 4

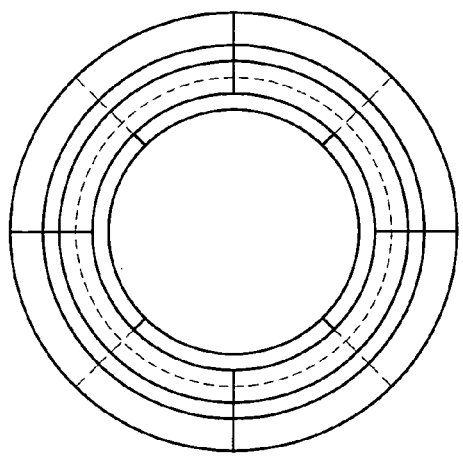
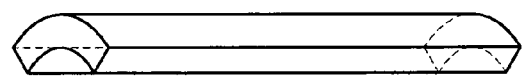
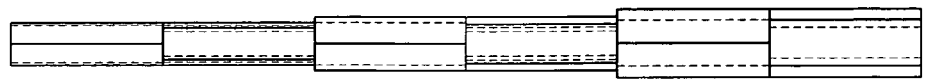
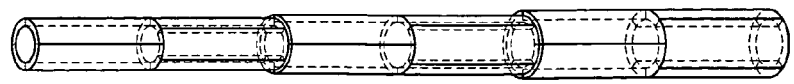
Fig. 5

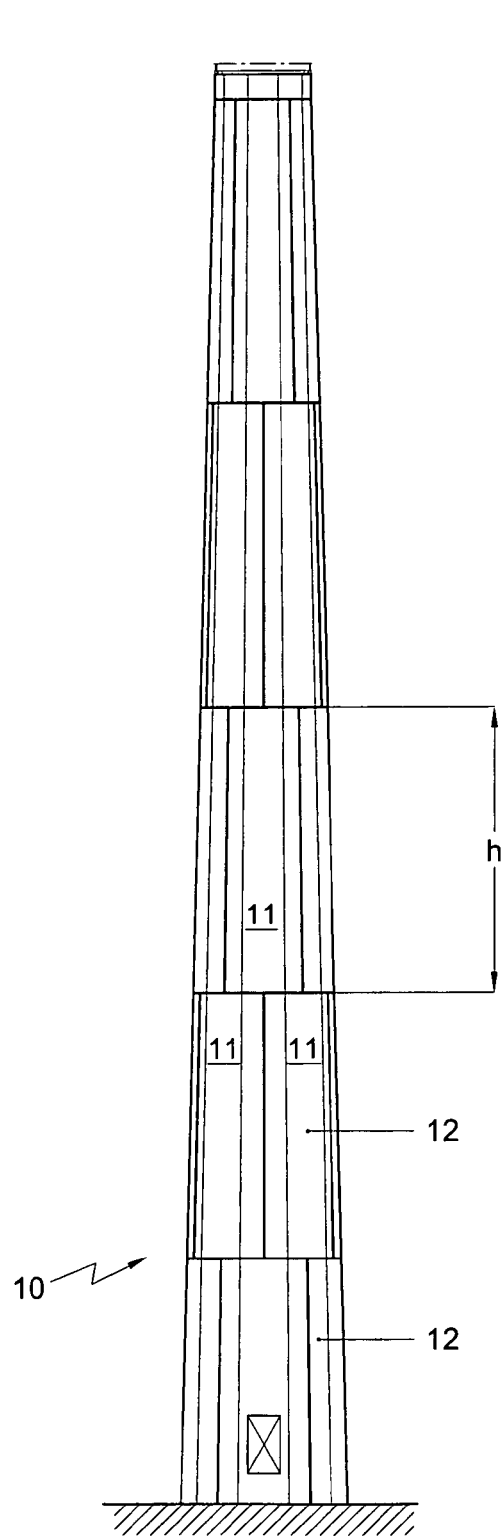
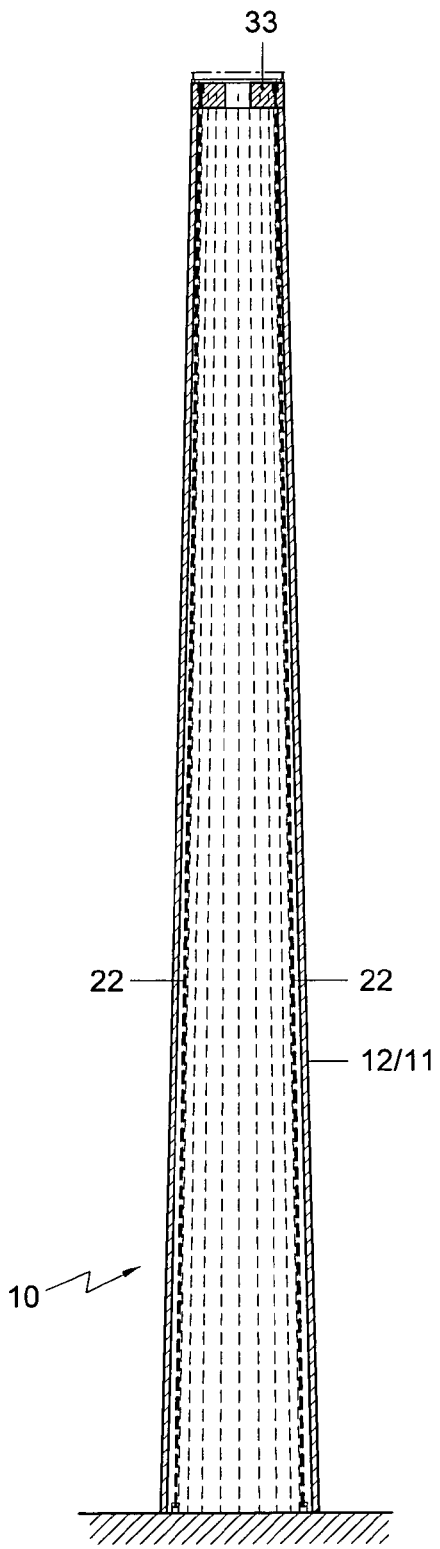
Fig. 10                              Fig. 11

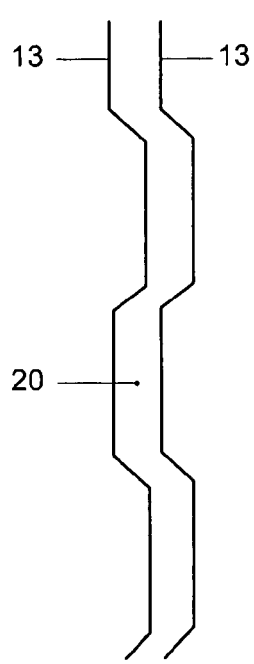
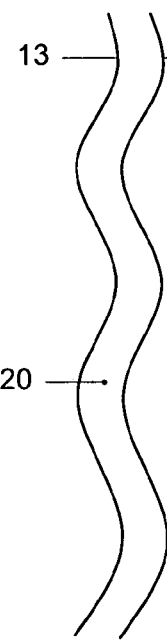
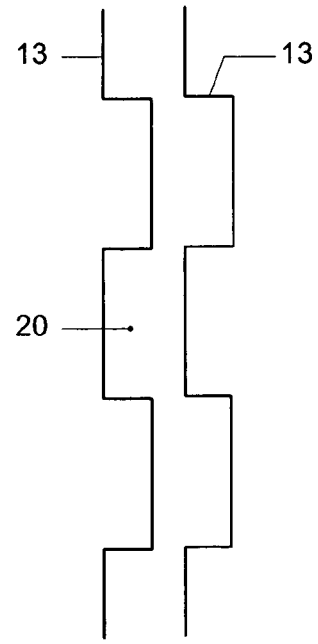
Fig. 13A            Fig. 13B            Fig. 13C
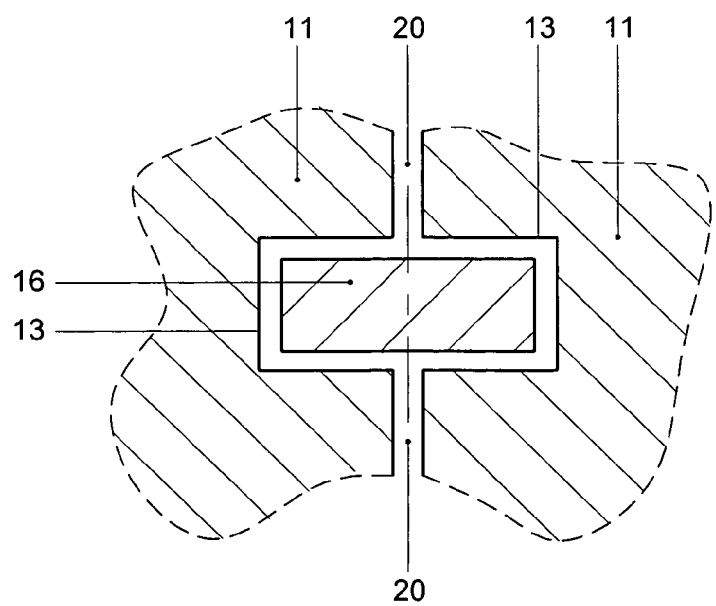
Fig. 13D

WIND TURBINE

CROSS-REFERENCE TO RELATED APPLICATIONS

This application claims priority to International Patent Application PCT/NL03/00103, filed 12 Feb. 2003, which claims priority of NL applicaiton 1019953, filed 12 Feb. 2002.

The invention relates to a wind turbine comprising a stationary vertical mast on which the moving part of a wind turbine is placed, which tower is at least partly composed of prefabricated parts.

DE-A-198 32921 describes a tower or mast having inner and outer walls composed of steel shells, between which a single concrete body has been poured. Optionally, the tower may be composed of prefabricated steel shell parts.

FR 1 145 789 describes a tower or mast built up from identical prefabricated concrete elements which are helically stacked.

At the moment, there are four conventional methods for making a tower or mast on which the moving parts of a wind turbine can be placed. These are:
cylindrical, steel masts/towers
lattice steel masts/towers
prefabricated concrete masts/towers
large concrete towers, poured in situ.

Steel masts have a number of drawbacks:
Less resistance to weather influences, in particular at sea.
In case of heavier wind turbines, cylindrical steel masts require very thick walls and large diameters, as a result of which they virtually cannot be used for reasons of production technique.
Cylindrical steel masts must often be built on shipyards.
The transport of the large steel masts involves many problems owing to the size of the parts when they have been made from one or two pieces.
High maintenance costs
Much work to install them (using a great many bolts)
Expensive cranes necessary
Less rigidity
Vibration absorbers necessary
Coating against weather influences necessary
Lattice masts have the drawback that they are considered visually unattractive.

The existing prefabricated concrete towers or masts are suitable for supporting wind turbines up to 1.8 MW. The towers are built up from complete cylindrical elements, while the lower end is made of two half elements. The elements are connected together by completely continuous tension cables and a mortar. When building up the tower, a tower crane is used to stack the elements.

Drawbacks:
(too) great (a) diameter for normal transport
difficult shape, therefore high production costs
much cable required (40 pieces, full length)
much precision required for the 40 cable ducts
expensive crane required for building up
Difficult to demolish (by blowing up or smashing)

The most conventional method for building towers capable of supporting heavy machines is pouring in situ. In this method, the form work and reinforcement are made on site and the concrete is poured in. This has the following drawbacks:
Less good quality of concrete and therefore less strength
Building depends on weather conditions
Large expensive crane and scaffolding necessary
Very time-consuming
Demolition must be done by smashing or blowing up.

It is an object of the present invention to avoid the above-mentioned drawbacks and to provide a wind turbine with a tower or mast that can be built up easily and rapidly from prefabricated parts, without necessitating special road transport and/or heavy equipment for building up the tower or mast. Since the tower serves to support the moving parts of the wind turbine, it must be able to resist very great forces in the horizontal and the vertical direction.

To this end, the invention provides a wind turbine, comprising a stationary vertical mast (or tower) on which the moving part of the wind turbine is arranged, which mast is at least partly composed of prefabricated wall parts, several juxtaposed wall parts forming a substantially annular mast part.

The tower is built up from several prefabricated segments, preferably of reinforced concrete or another stony material, which are placed on each other and/or in rings beside each other. The segments are placed side by side in a ring, for instance with three or more segments forming a polygonal ring. In the vertical direction several rings may be placed on each other. The segments may be connected together by using a mortar and/or post-tension cables. The segments at one height level are preferably identical. Depending on the choice of the shape of the cross-section of the tower, differently shaped segments are required. The tower preferably has a cross-section which is a polygon or a circle, the diameter of which decreases towards the top, so that a topped conical shape is realized or approximated. Another possibility is a tower or mast having a circular cross-section, one or more rings of the tower or mast being stepped on the inner and/or outer side, so that the outer diameter and/or wall thickness of a higher ring is smaller than of the respective lower ring.

Three base embodiments for the segments of a tower or mast having a polygonal cross-section are preferred:

1 Regular Polygonal Cross-section, Even Number of Angles (See FIGS. 1 and 2)

The segments (A) from which the tower or mast is built up have in all side surfaces a trapezium shape (B), which tapers upwards and is symmetric. A segment consists of two side surfaces which are connected together on the oblique side. When the cross-section is a regular polygon having an even number of angles, the segments are then always placed with the angle on top of the joint, between two subjacent segments, to prevent weak spots at that joint (see FIG. 1D). In this case the segment itself is preferably symmetric. This embodiment has the advantage that the whole tower can be made, if desired, with a single mold, with different settings. Also, in this way, mold segments can be made wider than is possible with the other embodiments.

2 Regular Polygonal Cross-section, Asymmetric Segments (See FIG. 3)

When the cross-section is a regular polygon in this embodiment, a side surface (E) of the tower, at the level of one ring, always consists of asymmetric parts of two segments which together form the tapered symmetric trapezium. These segments themselves are asymmetric, preferably with a short and a long side. When per ring of segments the base shape is mirrored, no long joints are formed in these embodiments either (see FIG. 3F). An advantage of this shape is that the short side (G) may be a parallelogram having a constant width, while the long side forms a tapered trapezium. This makes the shape of the mold, and hence the production of the segments, simpler. As the upper and lower side of a segment may be positioned against the wall of the form work, a more accurate surface can be obtained than when this is not the case.

3 Irregular Polygonal Cross-section, Even Number of Angles

The side surfaces of the tower or mast alternately consist of rectangular and tapered symmetric trapeziums. The segments also consist of a tapered trapezoid and a rectangular surface which are connected together on the oblique side of the trapezoid. The rectangular side is preferably alternately part of the left and the right side of a segment, so that here, too, long joints are prevented. In this embodiment, the cross-section of the tower or mast is an irregular polygon having an even number of angles. This embodiment has the advantage that there are always a number of surfaces that keep a constant width. As a result, it is easy to fit post-tension cables that run through the whole tower. Also, rectangular shapes are relatively easy to produce.

What the use of the trapezium shape of the faces entails is that a mold, and hence the segments themselves, is relatively easy to produce. In addition, the trapeziums enable a conical tower or mast.

There are also base embodiments for the segments of a tower or mast having a circular cross-section.

Circular Cross-section

When using a circular cross-section for a prefabricated tower, segments are used which jointly, in rings, form hollow circle cylinders (see FIGS. 4 and 5). To ensure that the required strength and mass of a ring do not exceed what is necessary, one or more rings may have a smaller wall thickness and/or diameter than the subjacent ring (see 4H and 5H). This boils down to one or more rings staggering on the inner (FIG. 4) and/or the outer side (FIG. 5). When using post-tension cables, the rings in this stepped form must be so positioned on each other as to allow sufficient space to fit post-tension cables (FIG. 6) through the walls of the whole. In relation to a round conical shape, a cylindrical shape has the advantage that it is easier to realize, so that the production costs are lower. Also, avoiding a truly conical shape, when used for wind turbines, has the advantage that the required maximum diameter at a specific height can be easily achieved.

The segments may optionally be provided with guides, for instance wheels or material of low friction, such as a smooth material, so that the segments can be moved up against the side of the tower. The segments are preferably of such a size and mass that they may be transported at any time in the respective country or countries without special permission and/or escort, preferably on freely chosen roads. This means for The Netherlands that they can be placed on a lorry such that they do not occupy more than a width of 3.5 m and, including the height of a lorry, a height of 4.2 m.

As the segments are prefabricated, under better controlled conditions than when pouring in situ, a better concrete quality can be obtained. This also contributes to the strength of the tower. Also, a prefabricated tower can thus be placed more rapidly, because there is no need to build a mold on site, or necessity to wait for appropriate weather conditions and hardening of the concrete.

It must preferably be possible for the segments to be placed such that vertical joints of two successive rings are not in line with each other. This can be achieved by arranging for segments, per ring of segments, to consist alternately of a left and a right design.

By arranging for any post-tension cables, possibly to be arranged later for internal reinforcement, not to run throughout the tower, and thus post-tensioning them at different heights, they can be used more efficiently (see FIG. 6). Optionally, a reinforcement, external relative to the wall, can be arranged on the inner side and/or outer side of the tower or mast, which provides tension in the direction of the center of the tower (see FIG. 7). This external reinforcement may also be tensioned at different heights, but is preferably attached to a ring which is attached on top of the upper segments. As a result, less cable is required in the walls and the cables are easier to arrange. The ring may also be used as connecting point for a machine to be placed on the tower or mast.

During the construction and destruction of the tower, hoisting means may be used, such as a crane, which uses the already constructed part of the tower itself as support and elevation. Such a crane is preferably capable itself of climbing up in or outside the tower. When the last segment of the tower has been placed, this crane can be removed by means of the crane necessary for placing the machine. The use of such a crane has the advantage that it is much less expensive in use than the conventional cranes used for this type of operations. When the same crane is also used during the destruction, the necessity for expensive tools and methods can be prevented. After the respective post-tension cables have been removed, the segments can be lowered with the crane. These can subsequently be reused or scrapped. This results in much less loose waste material than is the case when destructing towers poured in situ.

The enclosed FIGS. 1 and 2 show examples in which the cross-section of the tower is respectively octagonal and decagonal and segments of the base embodiment 1 are used. (A) shows a loose segment for the construction, respectively four and five of which are placed in a ring. For each ring, segments of different dimension are used. (B) is an example of a trapezoidal side surface. In (C) a top view is given, showing the polygon. At (D) in FIG. 1, it is shown how the segments are stacked so that no long joints are formed. In FIG. 3, parts of a decagonal variant are shown, using base embodiment 2. At (E) it is visible that a side surface of the tower always consists of parts of two segments. The segments mirrored per ring that are to prevent long joints, each having other dimensions, are shown at (F). The short part (G) of the segments has a constant width, while the other part gets shorter each higher ring. FIGS. 4 and 5 show examples of an embodiment with a circular cross-section. At (H), in both figures, a change of the inner and/or the outer diameter takes place, as described for the circular cross-section. In FIG. 4, this is an increase of the inner diameter, so that the wall thickness decreases, but the outer diameter remains constant. In FIG. 5, at (H) both the inner and the outer diameter decrease. FIG. 6 diagrammatically shows how post-tension cables (I), which do not run throughout the tower, can be used. These post-tension cables are arranged through shafts in the segments forming the walls of the tower or mast. A number of the cables and shafts runs from the foot to the top of the tower, while others are tensioned at a lower height. FIG. 7 shows a use of external reinforcement. Here, a number of bundles of post-tension cables (K) is attached to, for instance, a steel ring (J) on top of the tower and then to the foundation of the tower. These cables do not run through shafts in the wall (L), but freely through the inner side of the tower.

Further advantageous embodiments are given in the subclaims. The invention also relates to a mast for a wind turbine, a prefabricated wall part for a mast of a wind turbine and to a method for building a wind turbine.

The invention will be explained in more detail on the basis of an exemplary embodiment shown in a drawing. In the drawing:

FIG. 10 is a side view of a mast for a wind turbine according to the invention;

FIG. 11 is an upright cross-section of the mast of FIG. 10;

Figure 14A:
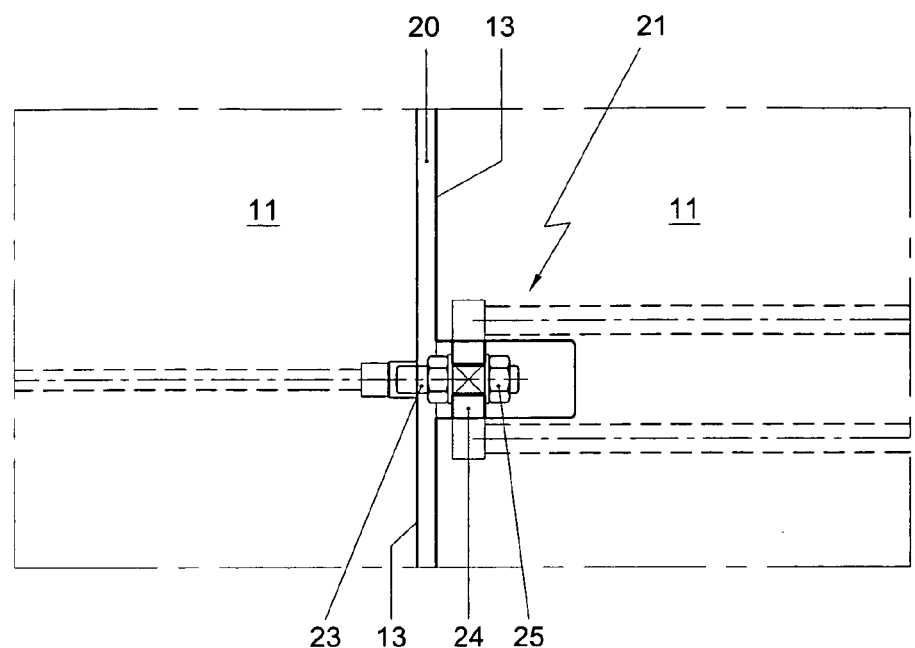
Figure 14B:
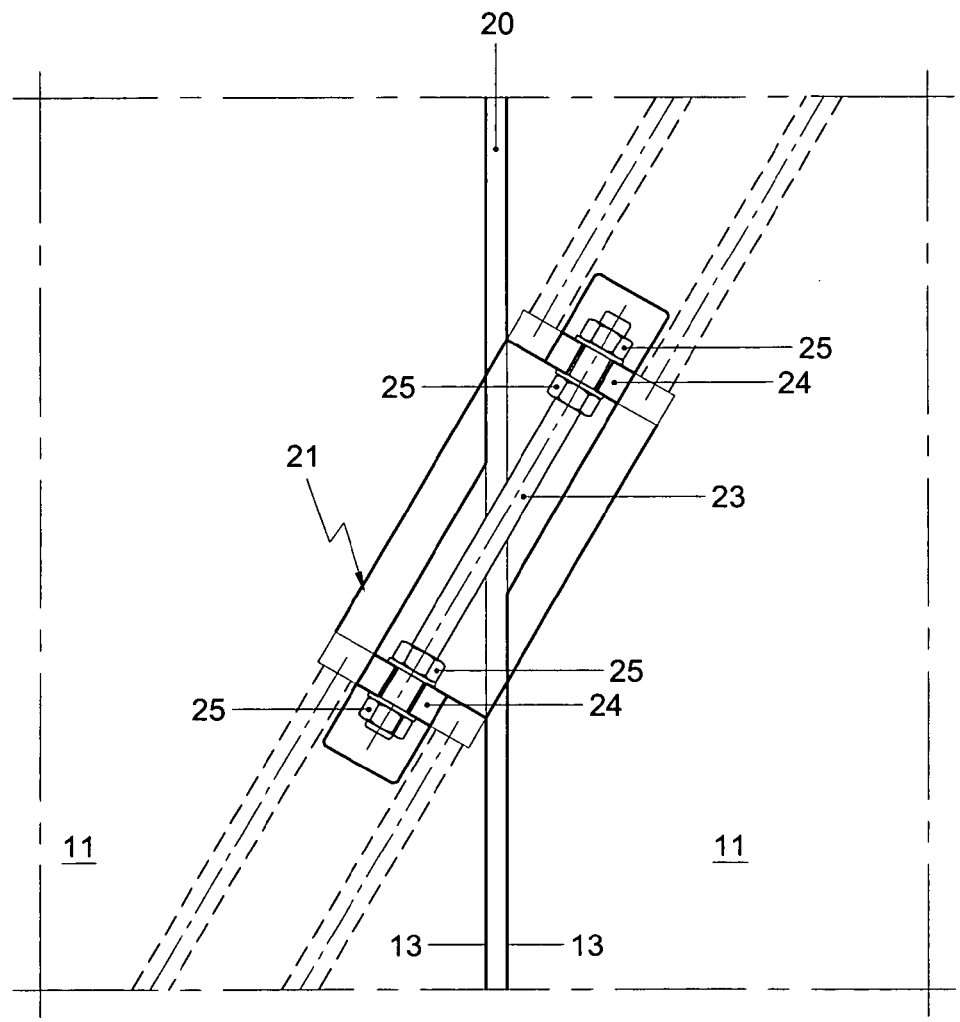
Figure 14C:
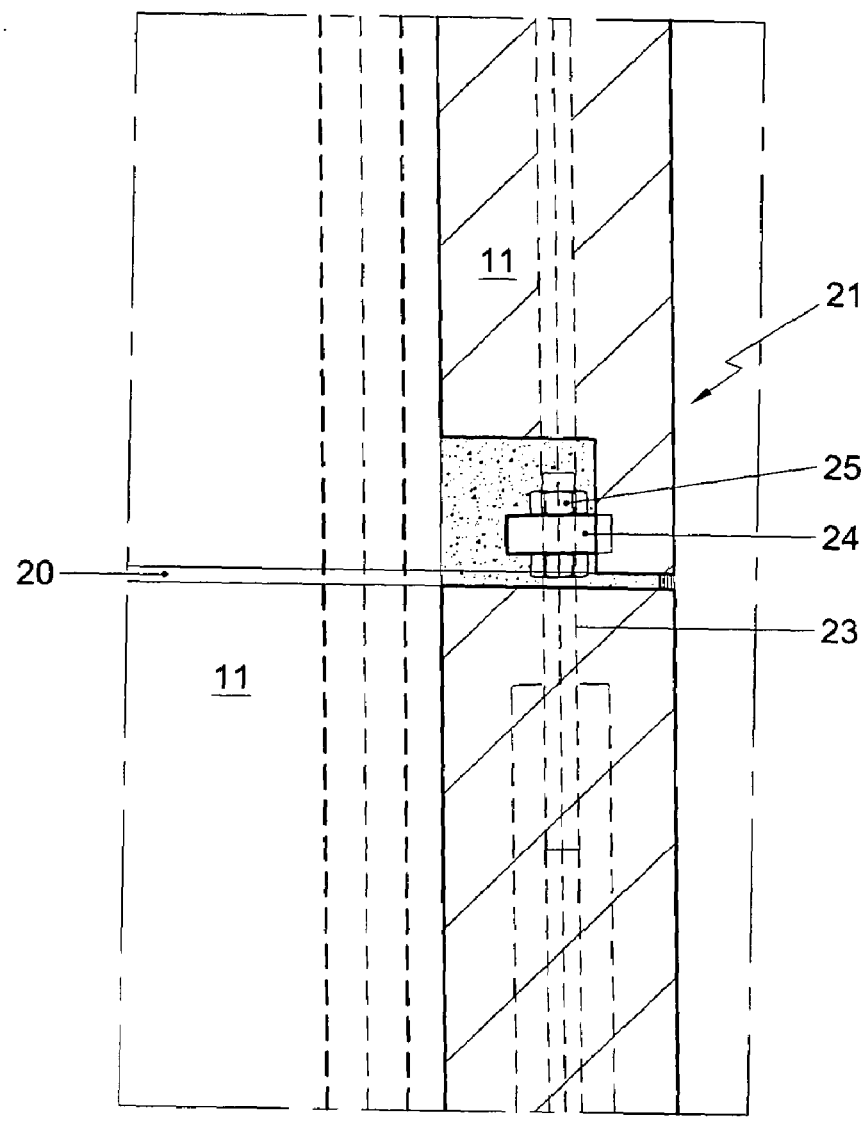
Figure 15:
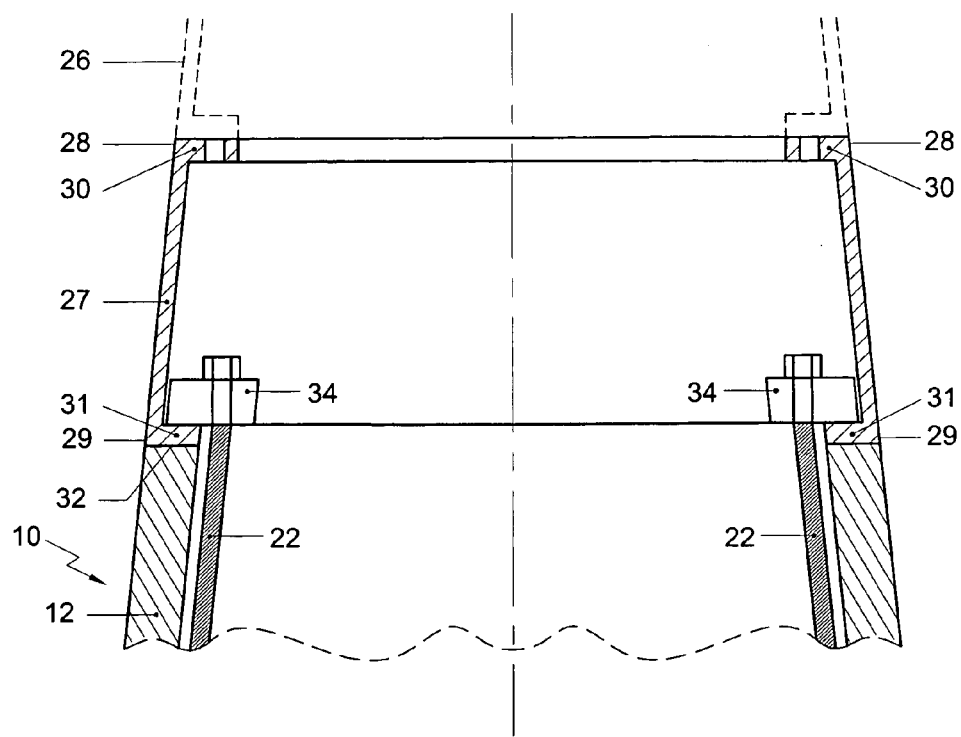
Figure 16:
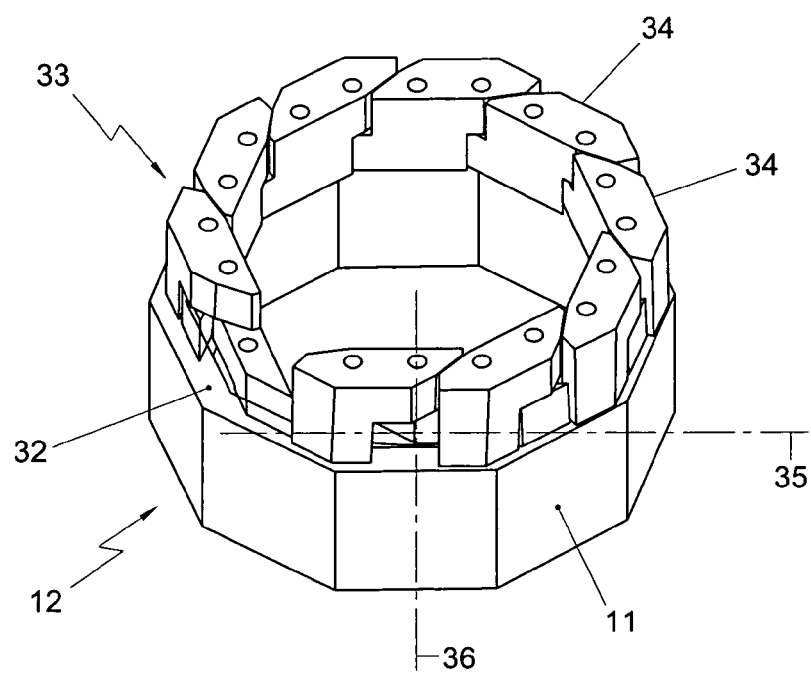
Figure 17A:
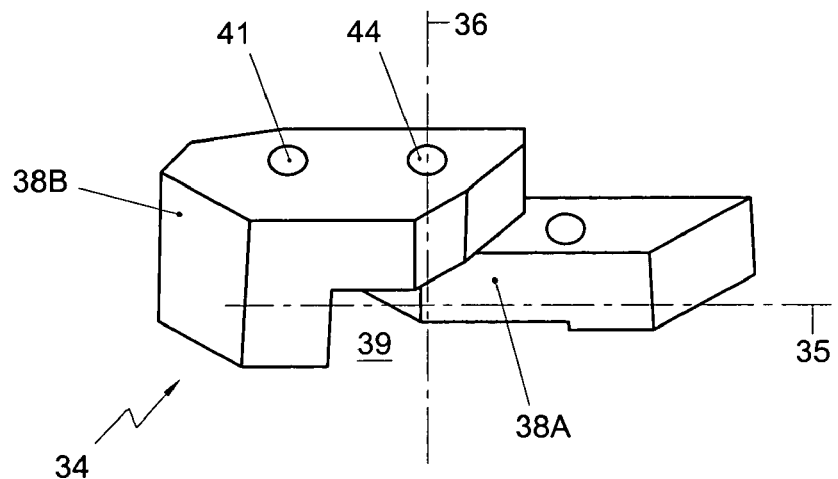
Figure 17B:
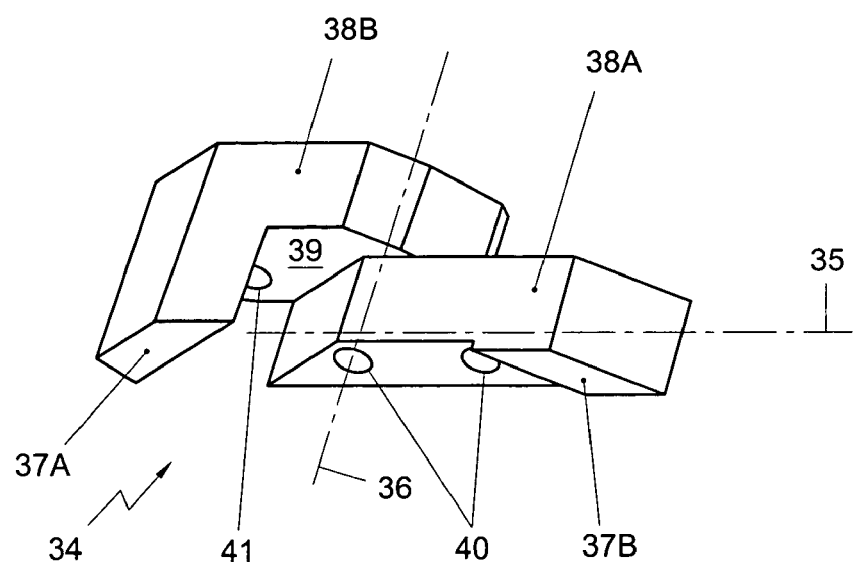
Figure 18A:
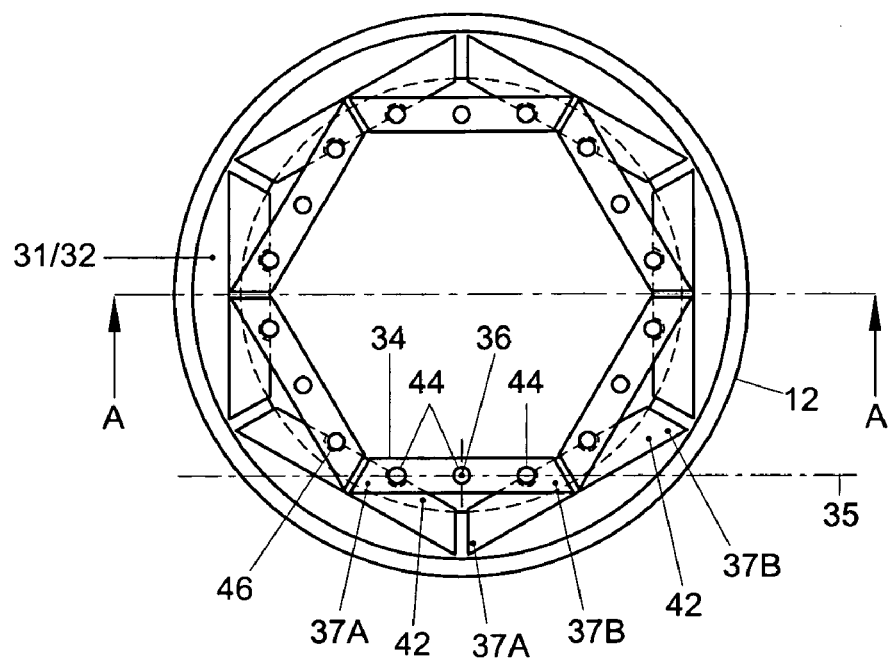
Figure 18B:
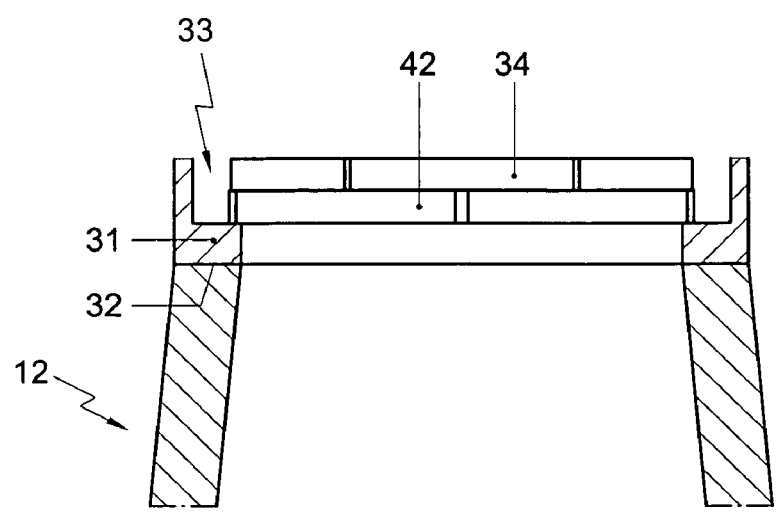

FIGS. 13A, B and C respectively show examples of different embodiments of stepped upright joints between segments;

FIG. 13D shows an insert piece between cooperating upright joints;

FIGS. 14A, B and C respectively show horizontal, diagonal and upright bolt connections between segments;

FIG. 15 shows a cross-section of a hybrid mast adjacent a connecting piece between a segmented concrete lower part and a prefabricated steel upper part of the mast;

FIG. 16 shows a perspective view of cooperating bridge parts for transmitting the tensile force from the anchoring cables to the tower segments;

FIGS. 17A and 17B show respectively a top view and a bottom view of a bridge part of FIG. 16;

FIGS. 18A and 18B show respectively a top view and a side view of an alternative embodiment of cooperating bridge parts.

The figures are only diagrammatic representations of preferred embodiments of the invention and are given by way of non-limitative exemplary embodiment. In the figures, similar or corresponding parts are denoted by the same reference numerals.

Figure 1:
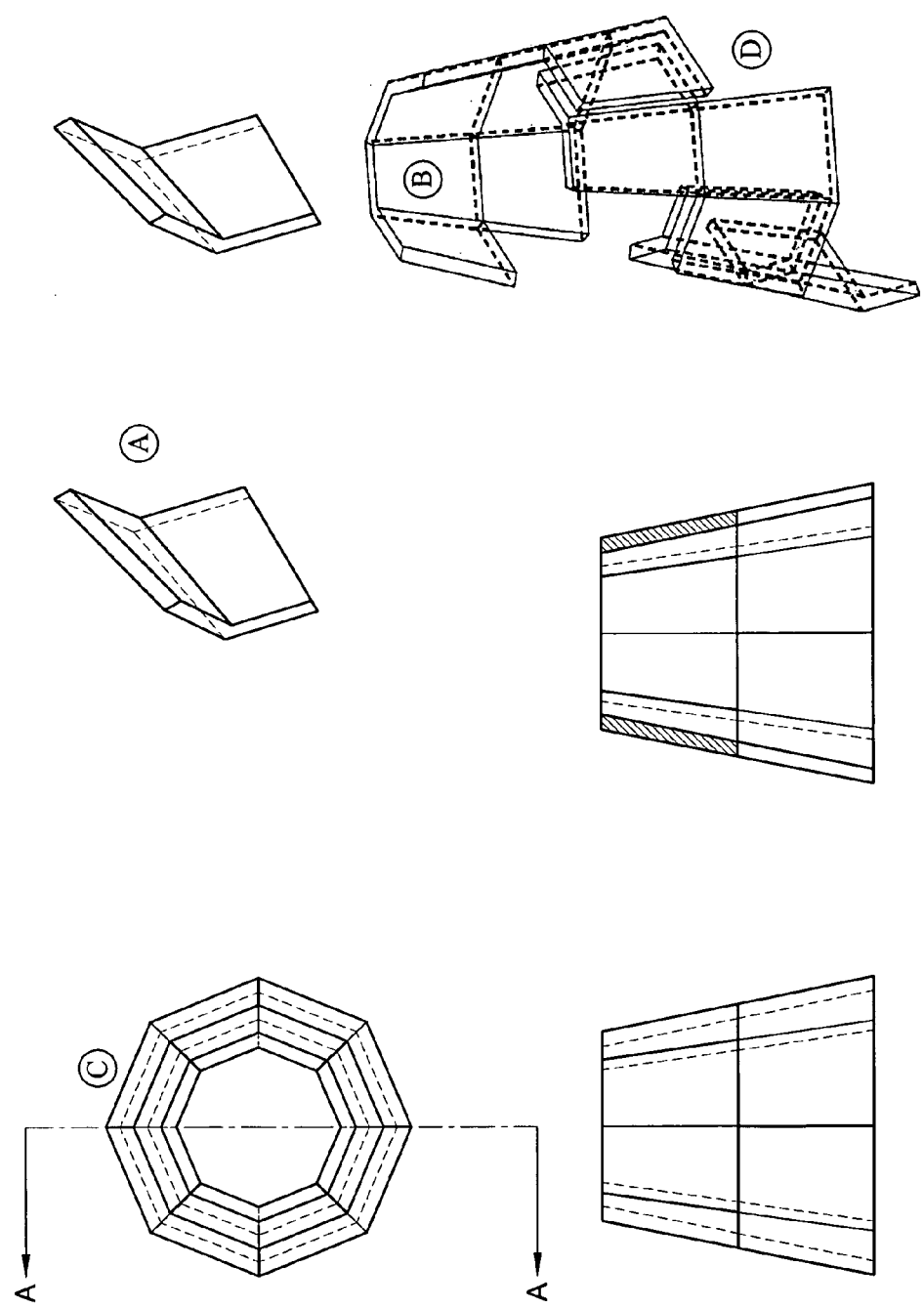
Figure 2:
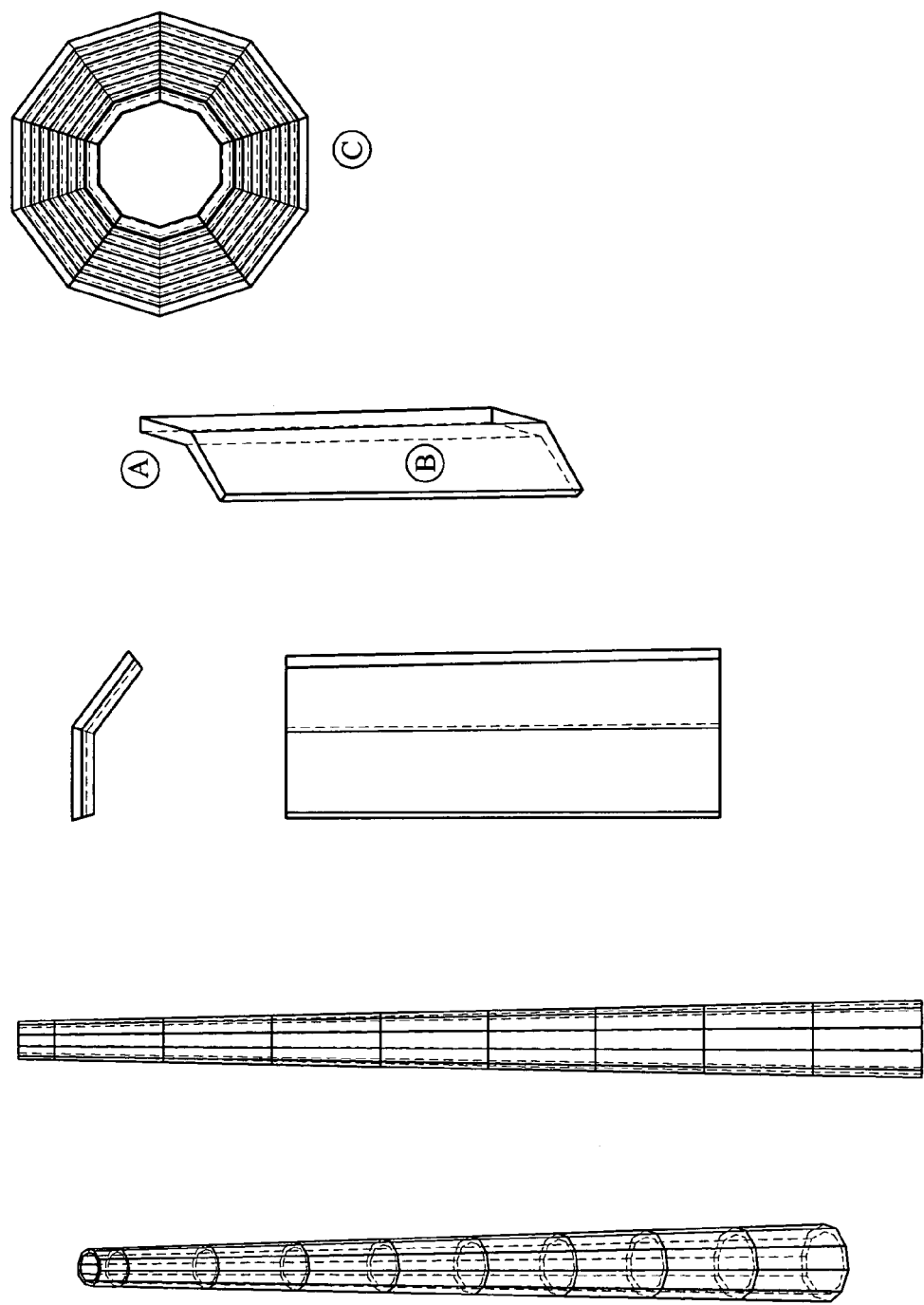
Figure 3:
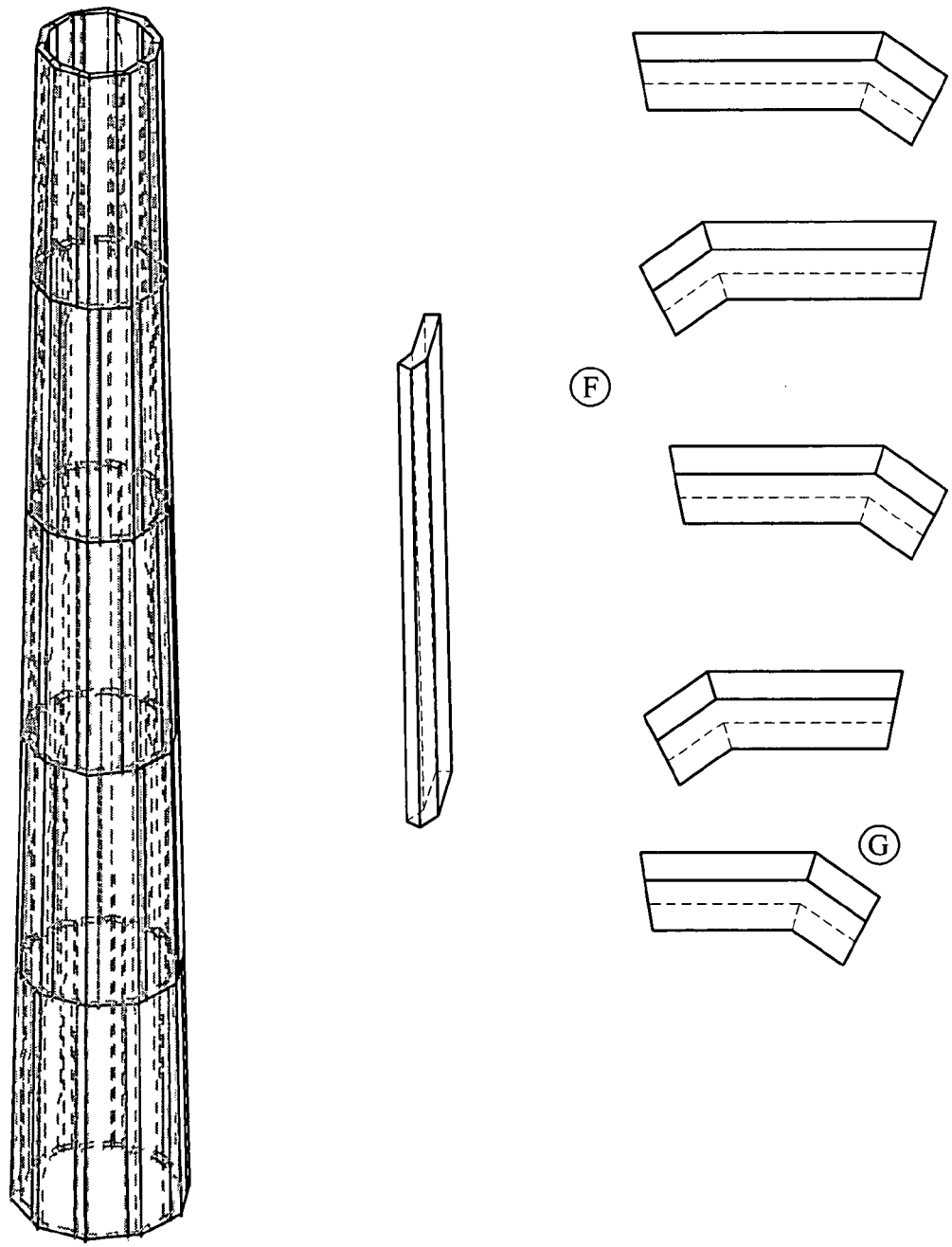
Figure 6:
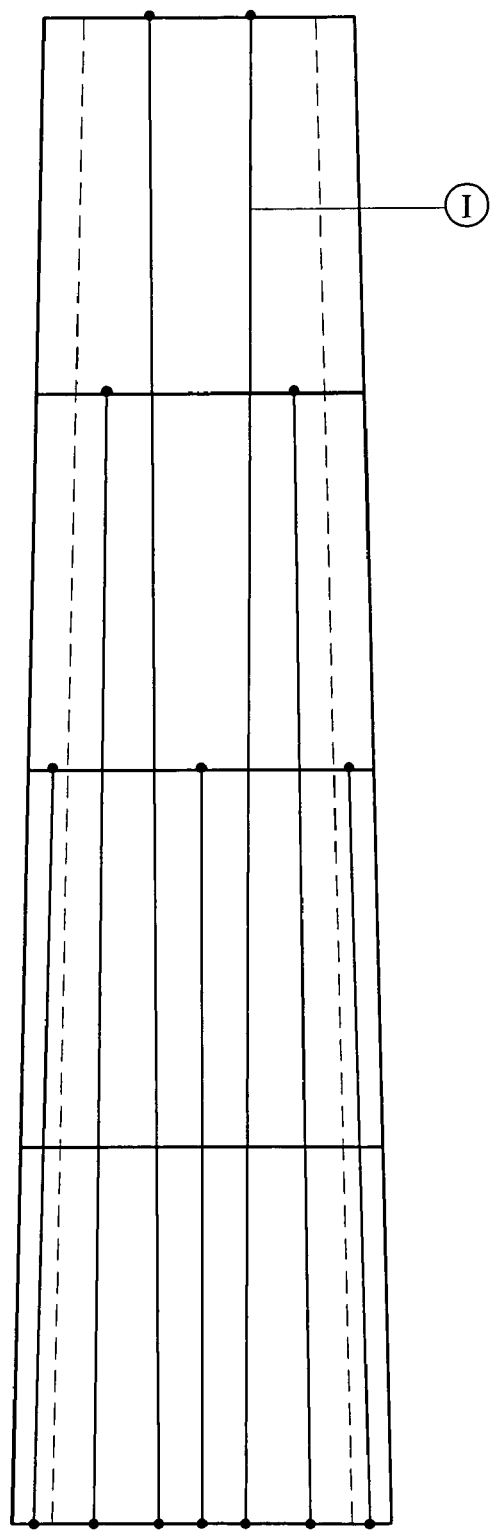
Figure 7:
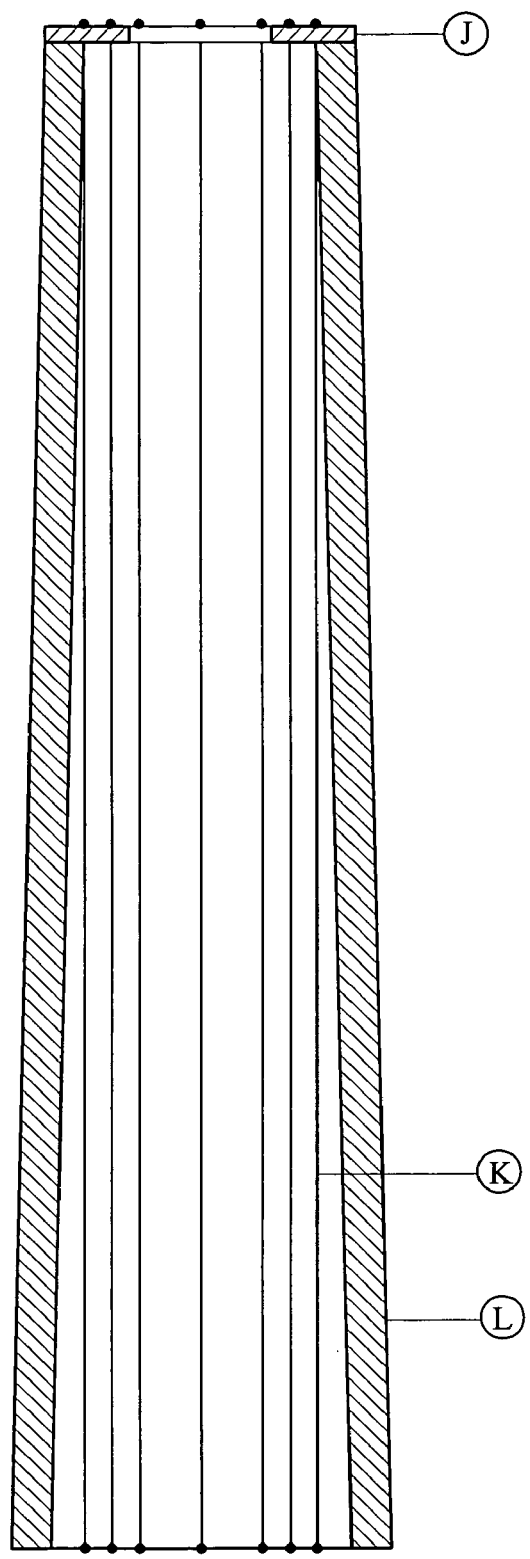
Figure 12:
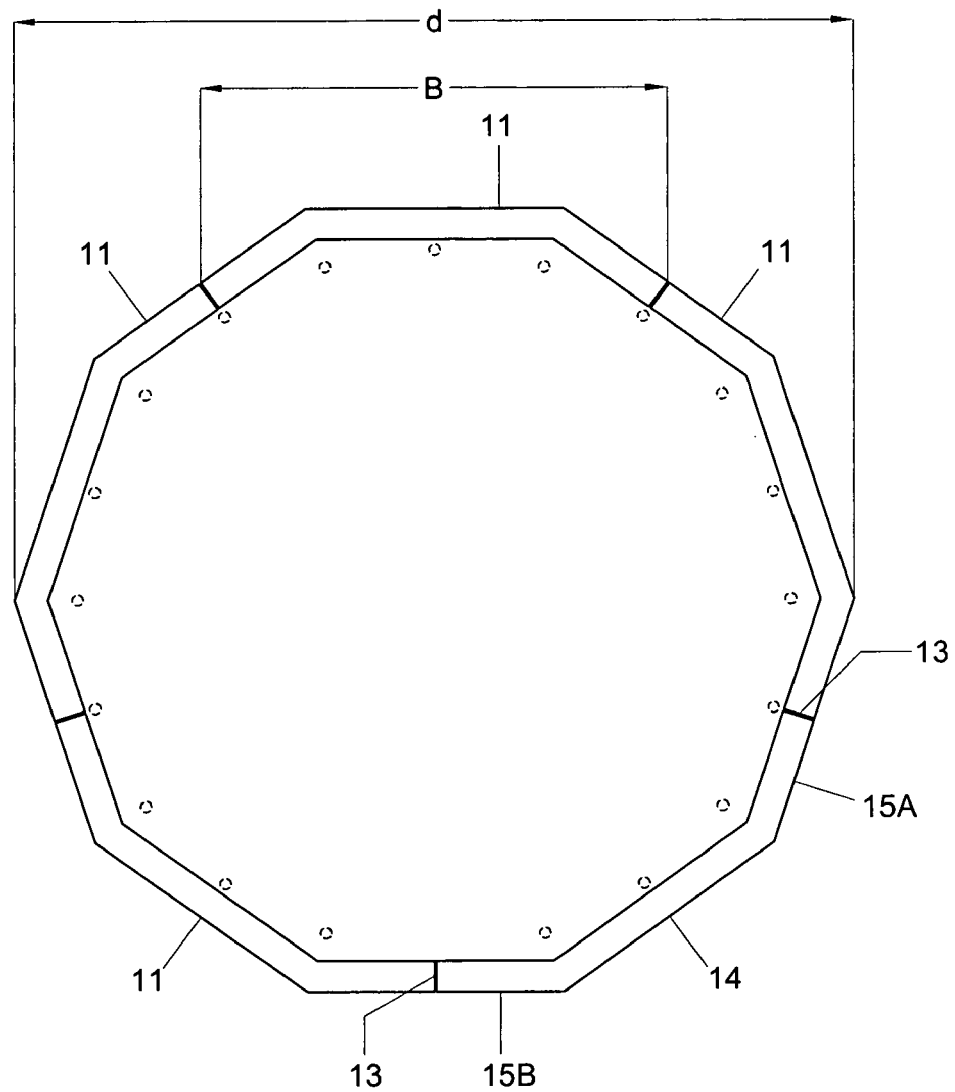
FIG. 12 is a horizontal cross-section of the mast of FIG. 10.

Referring to FIGS. 10–12, there is shown a stationary vertical mast 10, on which a moving part, not shown, of a wind turbine may be arranged. The mast 10 is at least partly composed of prefabricated wall parts or segments 11. Several juxtaposed wall parts form a substantially cylinder wall-shaped, annular mast part 12. In the vertical direction of the mast 10, several similar mast parts 12 built up from annularly arranged segments 11 are stacked. A mast part 12 is preferably composed of three or more wall parts 11. In this exemplary embodiment, the mast parts are composed of five wall parts 11 to form a ring having an equal decagonal cross-section. Per mast part 12, the wall parts 11 are equal; when the mast parts 12 are stacked, the wall parts 11 are similar in shape. The substantially cylindrical mast parts 12 taper conically upwards. Juxtaposed wall parts 12 are situated within a mast part 12 with substantially vertical edges 13 against each other. The greatest dimension in the height direction h of a wall part is preferably greater than the greatest dimension of that wall part in the width direction b, in particular the wall part 11 is more than twice higher than the greatest dimension of the wall part in the width direction. Also, the height h of the cylindrical mast part 12 is greater, preferably at least approximately twice greater, than the diameter d of the mast part 12. Furthermore, preferably, mast parts 12 located above each other lie against each other, while the vertical edges 13 with which the wall parts 11 lie against each other stagger in one mast part 12 relative to those of the other mast part 12. The edges 13 therefore do not lie in the same axial plane. The vertical edges 13 with which two juxtaposed wall parts 11 lie against each other touch the subjacent wall part 11 most preferably approximately in the middle.

The cross-section of the mast 10 is substantially cylindrical and tapers conically upwards. The cross-section of this substantially cylindrical shape is preferably a regular or irregular polygon, but may also be a circle.

Two juxtaposed wall parts 11 lie, adjacent the edge 13 where they abut each other, in line with each other. In this exemplary embodiment, the vertical edges 13 therefore do not lie in the angle of the polygon. Advantageously, the vertical edges 13 of a wall part 11 lie at mutually different distances from an angle of the polygon. A substantially vertical edge 13 of a wall part 11 runs preferably parallel to an angle line of the wall part 11. It is to be noted that it is quite possible as such for vertical edges 13 to be situated in an angle of the polygon.

In this exemplary embodiment, the wall parts 11 comprise a substantially flat body part 14 flanked on both sides by two side parts 15A, 15B, each enclosing an angle of the polygon relative to the body part 14. In the height direction, these angles form two angle lines of the wall part 11. It is of course also possible, as described before, to form an annular polygonal cross-section with wall parts 11 having a body part 14 flanked by only one side part 15. Furthermore, it is also possible, using wall parts, to form an annular, non-angular, smooth cross-section. For instance, with at least three circular arc-shaped segments a cylindrical annular cross-section can be realized. Furthermore, from such segments a mast part 12 having an oval or oval-like cross-section can be realized.

Referring to FIGS. 13A, B and C, there is shown that the vertical edges 13 of the wall parts 11 can cooperate while enclosing a meandering or stepped joint 20. This ensures that shifting of the vertical edges 13 of juxtaposed wall parts 11 along each other, compared to a straight joint, can be impeded, so that the mast 10 when bent will be distorted more as one whole. In these exemplary embodiments, the upright edges 11 of the wall parts 13 are therefore not straight, but stepped or slightly undulated. As an alternative, between adjacent vertical edges 13, means of a different type for inhibiting shifting of upright edges 13 of adjacent wall parts 11 along each other can be used. An example thereof is the insert piece 16 shown in FIG. 13D, which is enclosed by the upright edges of the wall parts 11. To this end, the adjacent upright edges 13 of adjacent wall parts 11 are staggered back adjacent the insert piece 16.

Referring to FIGS. 14A, B and C, there is shown that the wall parts 11 are connected by means of respectively a lying, a diagonal and an upright bolt connection 21. Such a bolt connection 21 can be used to connect the wall parts 11 together during the construction of the mast 10, so that the structure can bear its own weight and wind load, if any. After the mast 10 is ready, the joints 20 and the spaces around the bolt connection can be filled with joint filling, such as mortar. Together with tension cables 22, if any, the mast 10 can then bear not only its own weight, but also the moving parts of the wind turbine, in particular the gondola and rotor generator. The bolt connections 21 can not only facilitate the assembly of the mast 10, but can during use also transmit forces between the wall parts 11. In particular the lying and the diagonal bolt connections 21 can be used as means that can inhibit shifting of upright edges 13 of adjacent wall parts 11, so that this, too, will result in the segmented mast 10 being distorted more as one whole. Preferably, a bolt connection 21 in each case comprises a thread end 23 provided in the edge of a wall part, which thread end cooperates with a slotted plate 24 arranged at a corresponding place in the edge 13 of an adjacent wall part 11, through which slotted plate the bolt can extend. After the bolt 13 has been received in the slotted plate 24, the bolt can be tightened on the slotted plate by means of nuts 25.

Referring to FIG. 15, there is shown a hybrid mast, which is composed of a segmented concrete lower part 10 and a prefabricated cylindrical steel top mast 26. The steel top mast 26 and the segmented concrete mast 10 are coupled by means of an intermediate piece 27. The intermediate piece 27 comprises a steel hollow cylinder, preferably conical in the height direction, having on the upper side 28 and lower side 29 thereof flanges 30, 31 extending inwards relative to the cylinder wall. The steel top mast 26 can be fixed on the upper flange 30 by means of a bolt connection. The lower flange 3 can be clamped on the upper edge 32 of the segmented concrete mast 10 via an intermediate piece 33 in which post-tension cables are anchored. Advantageously, such an intermediate piece is built up from the cooperating bridge parts 34 described hereinbelow; the intermediate piece, however, may also be a conventional concrete or steel cover. Of course, the steel top mast 26 may also be provided with a lower flange with which it can be placed, without intermediate piece, directly on the upper edge of the segmented mast 10.

Referring to FIG. 16, there is shown in perspective view how the tensile force of the post-tension cables or reinforcing cables 22 can be transmitted to the upper edge 32 of the upper mast part 12 of the mast 10, built up from concrete segments 11. In particular with reinforcing cables 22 which, externally relative to the wall, run through the hollow inner space of the mast 10, the problem exists that owing to the eccentricity relative to the wall the reinforcing cables exert a moment on the upper edge of the wall parts 11.

To avoid this drawback, according to the invention the reinforcing cable 22 is supported via a bridge part 34 on the upper edge of the mast part direct, or indirectly via a flange enclosed therebetween. The bridge part is preferably freely supported on the edge 32. Via the inner space of the mast, the bridge part 34 forms a connecting line 35 between two points on the edge, the connecting line intersecting the center line 36 of the cable. The center line 36 is preferably oriented vertically, while the connecting line 35 is preferably oriented horizontally, so that center line 36 and connecting line are located in planes at right angles. The tensile force in the cable 22 can thus be transmitted to the wall of the mast 10 as pressure force without simultaneously exerting a bending moment on the edge 32. Preferably, several cables are anchored in each bridge part 34.

If the bridge parts 34 are of stepped or stacked design, they can be easily nested in annular form. In the exemplary embodiment shown here, each bridge part 34 has, as shown in FIGS. 17A and 17B, two supporting surfaces 37A, 37B for cooperation with the edge 22 of the mast part 10 or a flange 31, and the supporting surfaces 37A, 37B are connected by two plate-shaped parts 38A, 38B cooperating to form a step, which parts extend at two levels located above each other, and which are connected while enclosing a nest slot 39. Successive bridge parts 34 may then be placed in each case with their nest slot 39 over the lower plate part 38A of the preceding bridge part 34, so that a ring can be formed. In this exemplary embodiment, the lower plate parts 38A in each case comprise two passage holes 40 for passing the tension cables 22 to, respectively, a corresponding hole 44 in the upper plate part 38B of the same bridge 34 and a hole 41 in an upper plate part 38B of a cooperating bridge 34. The cables 22 are supported on the upper plate parts 38B of the bridges 34. The lower plate parts 38A of the bridges 34 lie free from the superjacent plate parts 38B and are therefore not energized by the upper plate part 38B of an adjacent bridge part 34 or by the cables 22 passed through the lower plate part 38A.

Referring to FIGS. 18A and B, there is shown a variant of the bridge parts 34, in which the bridge parts 34 lie in one plane.

Just like the above-described variant, the bridge parts extend via the inner space between two points on the edge 32 of the mast part. In this exemplary embodiment, the bridge parts 34 are beam-shaped and have been grouped to form a polygonal ring. In this example, the bridge parts 34 are supported on supporting beams 42, which have also been grouped to form a polygonal ring, such that the ends of the supporting beams are in each case supported on the edge 32 or the flange 31, while the ends of the bridge parts 34 are in each case supported on the supporting beams 42. The bridge parts 34 are provided with holes 44 for the tension cables 22 to be passed through. The supporting beams 42 are also provided with recesses or passage holes 40.

It is to be noted that the bridge parts described here may also advantageously be used to transfer tension cables arranged externally relative to the wall to substantially annular, conical or cylindrical masts of a different type, in particular to masts with integrally formed, annular concrete mast parts or integrally formed concrete mast parts which, for instance, have been poured on site. Also, when using groups of tension cables that do not extend throughout the length of the mast, bridge parts can be used at several points along the height.

It will be clear that the invention is not limited to the exemplary embodiments described herein. Many variations are possible within the scope of the invention as defined in the following claims.

The invention claimed is:

1. A wind turbine, comprising a stationary vertical mast on which a moving part of the wind turbine is arranged, said mast including an annular mast section composed of prefabricated adjacent wall parts, said adjacent wall parts being placed side by side and having a height and width, wherein said height is at least approximately twice said width and horizontal edges of said annular mast section are placed on top of horizontal edges of another mast section.

2. A wind turbine according to claim 1, wherein said mast section is composed of three or more wall parts.

3. A wind turbine according to claim 1, wherein the mast section tapers conically upwards.

4. A wind turbine according to claim 1, wherein the adjacent wall parts lie against each other along substantially vertical edges.

5. A wind turbine according to claim 4, wherein two cylindrical mast sections lie against each other, with the vertical edges by which the wall parts lie against each other staggering in one mast section relative to those of the other mast section.

6. A wind turbine according to claim 5, wherein the vertical edges by which two adjacent wall parts lie against each other touch said wall part approximately in the middle of the subjacent wall part.

7. A wind turbine according to claim 4, wherein the substantially vertical edges of the wall parts are stepped.

8. A wind turbine according to claim 1, wherein at least one of said wall parts is higher than the greatest dimension of that wall part in the width direction.

9. A wind turbine according to claim 1, wherein the height of the mast section is greater than the diameter of said mast section part.

10. A wind turbine according to claim 1, wherein the cross-section of the mast section has a substantially cylindrical shape and is circular.

11. A wind turbine according to claim 1, wherein the cross-section of the substantially cylindrical shape is one of a regular and irregular polygon.

12. A wind turbine according to claim 11, wherein two adjacent wall parts do not lie against each other in an angle of the polygon.

13. A wind turbine according to claim 11, wherein two substantially vertical edges of a wall part lie at mutually different distances from an angle of the polygon.

14. A wind turbine according to claim 11, wherein a substantially vertical edge of a wall part runs parallel to an angle line of said wall part.

15. A wind turbine according to claim 1, wherein the wall parts consist substantially of concrete.

16. A wind turbine according to claim 1, wherein the wall parts are connected at edges using bolt connections.

17. A wind turbine according to claim 1, wherein tension cables are supported via bridge parts on an upper edge of a mast section.

18. A wind turbine according to claim 1, wherein tension cables extend upwards through the interior of the mast at a distance from the wall parts.

19. A wind turbine according to claim 1, wherein said mast includes a plurality of mast sections, and at least a number of tension cables extend along only some of said mast sections.

20. A wind turbine according to claim 1, in which horizontal edges of said mast sections are in a nonoverlapping relation.

21. A wind turbine, comprising a stationary vertical mast on which a moving part of the wind turbine is arranged, said mast including a plurality of stacked annual mast sections, at least one of said mast sections being composed of at least three prefabricated adjacent wall parts being placed side by side forming the mast section, wherein the wall parts consist substantially of concrete.

22. A wind turbine according to claim 21, wherein the wall parts are connected at edges using bolt connections.

23. A wind turbine, comprising a stationary vertical mast on which a moving part of the wind turbine is arranged, said mast including an annular mast section composed of prefabricated wall parts, with several adjacent wall parts being placed side by side forming the mast section, wherein said mast including a plurality of mast sections, and at least a number of tension cables extend along only some of said mast sections.

* * * * *

UNITED STATES PATENT AND TRADEMARK OFFICE
CERTIFICATE OF CORRECTION

PATENT NO. : 7,160,085 B2
APPLICATION NO. : 10/504186
DATED : January 9, 2007
INVENTOR(S) : De Roest It is certified that error appears in the above-identified patent and that said Letters Patent is hereby corrected as shown below:

Replace published claims 8-19 with the following claims 8 - 19:

Col. 8, line 59
8. A wind turbine according to claim 1, wherein the height of the mast section is greater than the diameter of said mast section part.

Col. 8, line 62
9. A wind turbine according to claim 1, wherein the cross-section of the mast section has a substantially cylindrical shape and is circular.

Col. 8, line 65
10. A wind turbine according to claim 1, wherein the cross-section of the substantially cylindrical shape is one of a regular and irregular polygon.

Col. 9, line 1
11. A wind turbine according to claim 10, wherein two adjacent wall parts do not lie against each other in an angle of the polygon.

Col. 9, line 4
12. A wind turbine according to claim 10 wherein two substantially vertical edges of a wall part lie at mutually different distances from an angle of the polygon.

Col. 9, line 7
13. A wind turbine according to claim 10, wherein a substantially vertical edge of a wall part runs parallel to an angel line of said wall part.

Col. 9, line 10
14. A wind turbine according to claim 1, wherein the wall parts are connected at edges using bolt connections.

Col. 9, line 13
15. A wind turbine according to claim 1, wherein tension cables are supported via bridge parts on an upper edge of a mast section.

UNITED STATES PATENT AND TRADEMARK OFFICE
CERTIFICATE OF CORRECTION

PATENT NO. : 7,160,085 B2
APPLICATION NO. : 10/504186
DATED : January 9, 2007
INVENTOR(S) : De Roest It is certified that error appears in the above-identified patent and that said Letters Patent is hereby corrected as shown below:

Col. 9, line 15
    16. A wind turbine according to claim 1, wherein tension cables extend upwards through the interior of the mast at a distance from the wall parts.

Col. 9, line 17
    17. A mast for a wind turbine, as defined in claim 1.

Col. 9, line 20
    18. A prefabricated wall part for a mast of a wind turbine, as defined in claim 1.

Col. 9, line 23
    19. A method for building a wind turbine, wherein the mast is composed from wall parts, as defined in claim 1.

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,160,085 B2 | Page 1 of 1 |
| APPLICATION NO. | : 10/504186 | |
| DATED | : January 9, 2007 | |
| INVENTOR(S) | : De Roest | |

It is certified that error appears in the above-identified patent and that said Letters Patent is hereby corrected as shown below:

Replace published claims 8 - 19 with the following claims 8 - 19:

Col. 8, line 59 8. A wind turbine according to claim 1, wherein the height of the mast section is greater than the diameter of said mast section part.

Col. 8, line 62 9. A wind turbine according to claim 1, wherein the cross-section of the mast section has a substantially cylindrical shape and is circular.

Col. 8, line 65 10. A wind turbine according to claim 1, wherein the cross-section of the substantially cylindrical shape is one of a regular and irregular polygon.

Col. 9, line 1 11. A wind turbine according to claim 10, wherein two adjacent wall parts do not lie against each other in an angle of the polygon.

Col. 9, line 4 12. A wind turbine according to claim 10 wherein two substantially vertical edges of a wall part lie at mutually different distances from an angle of the polygon.

Col. 9, line 7 13. A wind turbine according to claim 10, wherein a substantially vertical edge of a wall part runs parallel to an angle line of said wall part.

Col. 9, line 10 14. A wind turbine according to claim 1, wherein the wall parts are connected at edges using bolt connections.

Col. 9, line 13 15. A wind turbine according to claim 1, wherein tension cables are supported via bridge parts on an upper edge of a mast section.

Col. 9, line 15  16. A wind turbine according to claim 1, wherein tension cables extend upwards through the interior of the mast at a distance from the wall parts.

Col. 9, line 17 17. A mast for a wind turbine, as defined in claim 1.

Col. 9, line 20 18. A prefabricated wall part for a mast of a wind turbine, as defined in claim 1.

Col. 9, line 23 19. A method for building a wind turbine, wherein the mast is composed from wall parts, as defined in claim 1.

Signed and Sealed this

Fifteenth Day of December, 2009

David J. Kappos
*Director of the United States Patent and Trademark Office*

(12) EX PARTE REEXAMINATION CERTIFICATE (10478th)
United States Patent
de Roest

(10) Number: US 7,160,085 C1
(45) Certificate Issued: Jan. 20, 2015

(54) WIND TURBINE

(75) Inventor: Anton Herrius de Roest, Enschede (NL)

(73) Assignee: Postensa Wind Structures S.A. de C.V., Mexico City (MX)

Reexamination Request:
No. 90/012,509, Sep. 12, 2012

Reexamination Certificate for:
Patent No.: 7,160,085
Issued: Jan. 9, 2007
Appl. No.: 10/504,186
Filed: Mar. 4, 2005

Certificate of Correction issued Dec. 1, 2009
Certificate of Correction issued Dec. 15, 2009

(21) Appl. No.: 90/012,509

(22) PCT Filed: Feb. 12, 2003

(86) PCT No.: PCT/NL03/00103
§ 371 (c)(1),
(2), (4) Date: Mar. 4, 2005

(87) PCT Pub. No.: WO03/069099
PCT Pub. Date: Aug. 21, 2003

(30) Foreign Application Priority Data

Feb. 12, 2002 (NL) .................................... 1019953

(51) Int. Cl.
*F03D 11/04* (2006.01)

(52) U.S. Cl.
USPC .............................. 416/244 R; 52/40; 52/849

(58) Field of Classification Search
None
See application file for complete search history.

(56) References Cited

To view the complete listing of prior art documents cited during the proceeding for Reexamination Control Number 90/012,509, please refer to the USPTO's public Patent Application Information Retrieval (PAIR) system under the Display References tab.

*Primary Examiner* — William Doerrler

(57) ABSTRACT

A wind turbine, comprising a stationary vertical mast (or tower) on which a moving part of the wind turbine is arranged, which mast is at least partly composed from prefabricated wall parts, with several adjacent wall parts forming a substantially annular mast section. The invention also relates to a mast for a wind turbine, to a prefabricated wall part and to a method for building a wind turbine.

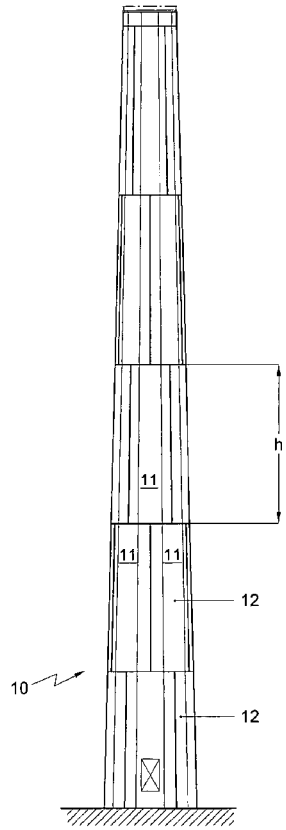

US 7,160,085 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 8, 17 and 18 are cancelled.

Claims 1, 15, 21 and 23 are determined to be patentable as amended.

Claims 3-7, 9-14, 16, 19, 20 and 22, dependent on an amended claim, are determined to be patentable.

New claims 24-31 are added and determined to be patentable.

1. A wind turbine, comprising a stationary vertical mast on which a moving part of the wind turbine is arranged, said mast including an annular mast section composed of prefabricated adjacent wall parts *that consist substantially of concrete*, said adjacent wall parts being placed side by side and having a height and width, wherein said height is at least approximately twice said width and horizontal edges of said annular mast section are placed on top of horizontal edges of another mast section, *wherein said mast section is composed of three or more wall parts and the height of said mast section is greater than the diameter of said mast section*.

15. [A wind turbine according to claim 1] *A wind turbine, comprising a stationary vertical mast on which a moving part of the wind turbine is arranged, said mast including an annular mast section composed of prefabricated adjacent wall parts that consist substantially of concrete, said adjacent wall parts being placed side by side and having a height and width, wherein said height is at least approximately twice said width and horizontal edges of said annular mast section are placed on top of horizontal edges of another mast section, wherein said mast section is composed of three or more wall parts and the height of said mast section is greater than the diameter of said mast section*, wherein tension cables are supported via bridge parts on an upper edge of a mast section.

21. A wind turbine, comprising a stationary vertical mast on which a moving part of the wind turbine is arranged, said mast including a plurality of stacked annual mast sections, at least one of said mast sections being composed of at least three prefabricated adjacent wall parts being placed side by side forming the mast section, wherein the wall parts consist substantially of concrete, *said adjacent wall parts having a height and width, wherein said height is at least approximately twice said width*.

23. A wind turbine, comprising a stationary vertical mast on which a moving part of the wind turbine is arranged, said mast including an annular mast section composed of prefabricated wall parts, with several adjacent wall parts being placed side by side forming the mast section, *said adjacent wall parts having a height and width, wherein said height is at least approximately twice said width*, wherein said mast including a plurality of mast sections, and at least a number of tension cables extend along only some of said mast sections.

*24. A wind turbine according to claim 1, wherein the height of said mast section is at least twice greater than the diameter of said mast section.*

*25. A wind turbine, comprising a stationary vertical mast on which a moving part of the wind turbine is arranged, said mast including an annular mast section composed of prefabricated adjacent wall parts that consist substantially of concrete, said adjacent wall parts being placed side by side and having a height and width, wherein said height is at least approximately twice said width and horizontal edges of said annular mast section are placed on top of horizontal edges of another mast section, wherein said mast section is composed of three or more wall parts and the height of said mast section is greater than the diameter of said mast section, wherein the cross-section of the substantially cylindrical shape is one of a regular and irregular polygon, and wherein two substantially vertical edges of a wall part lie at mutually different distances from an angle of the polygon.*

*26. A wind turbine according to claim 1, wherein the adjacent wall parts have edges with cooperating vertical portions and horizontally overlapping portions.*

*27. A wind turbine according to claim 1, further comprising a prefabricated steel top mast coupled to an uppermost mast section.*

*28. A wind turbine according to claim 27, further comprising a first intermediate piece between the prefabricated steel top mast and the uppermost mast section, wherein the first intermediate piece is coupled to the prefabricated steel top mast and the uppermost mast section.*

*29. A wind turbine according to claim 28, wherein the first intermediate piece is a steel hollow cylinder that tapers conically upward.*

*30. A wind turbine according to claim 28, wherein the prefabricated steel top mast is bolted to an upper flange of the first intermediate piece, and wherein the first intermediate piece has a lower flange that is clamped to an upper edge of the uppermost mast section by a second intermediate piece.*

*31. A wind turbine according to claim 30, wherein the second intermediate piece comprises at least one of multiple bridge pieces, a steel cover, and a concrete cover.*

\* \* \* \* \*